June 1, 1965 R. E. EASTMAN ETAL 3,187,201
ONE-SHOT LATCH
Filed May 18, 1962
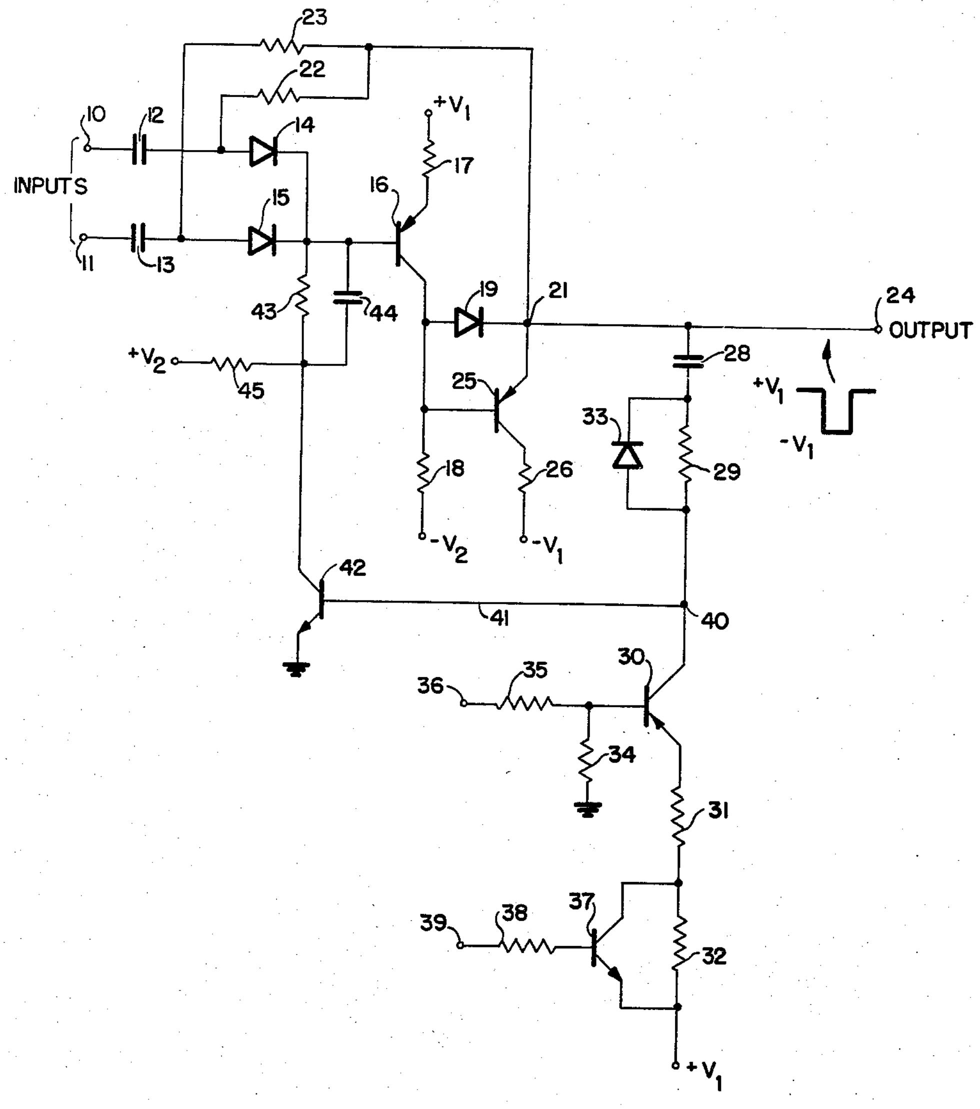
INVENTOR.
ROBERT E. EASTMAN
BY JOHN R. KOLDEN
Samuel B. Stone
ATTORNEY United States Patent Office 3,187,201
Patented June 1, 1965

3,187,201
ONE-SHOT LATCH
Robert E. Eastman, Fullerton, and John R. Kolden, Riverside, Calif., assignors to Beckman Instruments, Inc., a corporation of California
Filed May 18, 1962, Ser. No. 195,812
6 Claims. (Cl. 307—88.5)

This invention relates to an electronic circuit and more particularly to a one-shot latch which provides output pulses having a predetermined precise duration.

Latches are utilized to provide output pulses having a predetermined width and magnitude in response to input signals which may deviate from a desired standard. It is necessary that a latch provide output pulses which are precise in duration and time of occurrence. It is desirable in many instances to control the width of the output pulses. Where control of the width of the output pulses is provided, there should be a predetermined relationship between an applied control signal and the width of the output pulse. Prior latches have not provided precise output pulses, or precise control of the width of the output pulses.

Accordingly, it is a feature of the present invention to provide a one-shot latch which responds to an input pulse to provide an output pulse having a duration which may be precisely controlled by one or more externally applied voltages.

Another feature of the present invention is the provision of a one-shot latch in which precise control of the time of occurrence and the duration of the generated output signal is provided.

An additional feature of the present invention is the utilization of a constant current source and an impedance means in a one-shot latch to control the duration of an output pulse.

According to the present invention, a one-shot latch is provided including a constant current source for supplying current to a first junction. The magnitude of the current is determined by one or more control voltages. The junction is connected with a first transistor and with an impedance means. The constant current normally is supplied through the first transistor. The first transistor is connected to an input transistor which, in turn, is connected through an impedance means to the output of the latch. A predetermined input signal turns off the input transistor to provide an output signal. This action causes the first transistor to turn off. Current is supplied by the constant current source through the junction to the impedance means rather than through the first transistor. After a predetermined period of time, which is related to the value of the impedance means and the magnitude of the constant current, the first transistor again turns on and receives the constant current. The input transistor then turns on and the output pulse terminates.

Other features and objects of the invention will be better understood from a consideration of the following detailed description when read in conjunction with the attached drawing which illustrates a one-shot latch constructed in accordance with the teachings of the present invention.

Input terminals 10 and 11 are connected through respective capacitors 12 and 13 and respective diodes 14 and 15 to the base of a transistor 16. An input signal may be applied to either of the terminals 10 or 11 to operate the latch since the diodes 14 and 15 and associated biasing components function as an Or circuit.

The emitter of the transistor 16 is connected through a resistance 17 to a positive voltage V1, such as plus twelve volts, from a voltage source (not shown). The collector of the transistor 16 is connected through a resistance 18 to a negative voltage V2, such as minus eighteen volts, from a voltage source (not shown). The collector of the transistor 16 also is connected through a diode 19 to a terminal 21. The terminal 21 is connected through resistances 22 and 23 to the respective diodes 14 and 15. The junction 21 also is connected to an output terminal 24, and to an emitter of a transistor 25. The collector of the transistor 16 is connected to the base of the transistor 25. The collector of the transistor 25 is connected through a resistance 26 to a negative voltage V1.

A capacitor 28 is connected with the terminal 21 and output terminal 24, and connected through a resistance 29, the collector-emitter path of a transistor 30, a resistance 31, and a resistance 32 to the positive voltage V1. A diode 33 is connected across the resistance 29. The base of the transistor 30 is connected through a resistance 34 to ground, and through a resistance 35 to a control terminal 36. A transistor 37 has its collector-emitter circuit connected across the resistance 32. The base of the transistor 37 is connected through a resistance 38 to a control terminal 39.

A junction 40 between the collector of the transistor 30 and the resistance 29 is connected through a line 41 to the base of a transistor 42. The emitter of the transistor 42 is grounded, and the collector of this transistor is connected through the parallel combination of a resistance 43 and capacitance 44 to the base of the transistor 16. The collector of the transistor 42 also is connected through a resistance 45 to the positive voltage V2.

In the latch illustrated in the drawing, a positive-going input signal applied to either of the input terminals 10 or 11 causes an output pulse to be provided on the output terminal 24 and the output pulse has a duration which is a function of the current (I) from the transistor 30 and the capacity (C) of the capacitance 28. The current may be controlled by the voltages applied to the input terminals 36 and 39. The input pulse applied to the input terminal 10 or 11 may have an extremely short duration. The output pulse goes from +V1 to −V1 at the time of the positive-going input signal, and the output stays at the −V1 level, since the circuit is latched, even when the input signal goes to zero. The period of time that the output remains at the −V1 level is determined by I and C as noted above. The latch provides precise control of the time of occurrence and the duration of the output signal, the input pulse may be shorter than the output pulse, and the output is a low impedance output. The maximum pulse repetition rate may be controlled by the choice of particular components.

The transistor 30 and its associated components function as a constant current source to supply current to the junction 40. The magnitude of this current is determined by the voltages applied to the terminals 36 and 39. The voltage applied to the terminal 39 may cause the transistor 37 to operate as a switch to thereby shunt the resistance 32, or to cause the transistor 37 to act as a variable resistance. The voltage applied to the terminal 39 may provide coarse control, and the voltage applied to the terminal 36 may provide fine control. The current may be any desired function of the control voltage. For example, if the transistor 37 is operated as a switch the relationship is linear. The current is a logarithmic function of the voltage applied to the terminal 36.

When no input signal is applied to either of the input terminals 10 or 11, the current from the current source transistor 30 is supplied to the base of the transistor 42 and flows through the base-emitter junction of the transistor 42 to ground. Thus, the transistor 42 is turned on and acts as a switch, and the collector thereof is at approximately ground potential. The transistor 16 is turned on and current flows from the +V1 source through the resistance 17, the emitter-base junction of the transistor 16, the resistance 43 and the transistor 42 to ground. The +V1 voltage is supplied through the emitter-collector path of the transistor 16 and the diode 19 to the output terminal 24. The voltage drop across the diode 19 holds the transistor 25 off. The upper plate of the capacitor 28 is at a voltage +V1, while the lower plate connected through the resistors 29 and the diode 33 is at substantially ground potential. Hence, the voltage across the capacitance 28 is substantially +V1.

Assuming that a positive-going pulse is applied to either of the input terminals 10 or 11, this pulse is applied through the capacitor 12 or 13 and the diode 14 or 15 to the base of the transistor 16. The transistor 16 turns off, and the voltage on the base of the transistor 25 goes more negative. When the voltage on the base of the transistor 25 becomes sufficiently negative, this transistor is turned on and a voltage of $-V1$ is applied to the output terminal 24. The voltage at the junction 40 goes from ground (zero volts) to $-[+V1-(V1)]$. If V1 is 12 volts, the voltage at the junction 40 goes to −24 volts. This voltage at the junction 40 turns off the transistor 42. When the transistor 42 turns off, its collector voltage goes toward positive V2. The voltage +V2 is applied through the resistances 43 and 45 to the base of the transistor 16, thereby holding the transistor 16 off. The circuit is now latched, with the output voltage at −V1.

The current from the transistor 30 flows through the diode 33 and into the capacitor 28. This action causes the voltage at the junction 40 to increase linearly, with a rate determined by the current and the value of the capacitance, toward a positive voltage. The diode 33 prevents the turn-on time of the latch from being a function of the current through the resistance 29, since there is a constant drop across the diode 33 for a large range of currents. The diode 33 also compensates for variations in base-to-emitter voltage of the transistor 42 as a result of temperature variations. The resistance 29 allows the capacitor 28 to reset or recharge. The voltage at the junction 40 may be indicated as follows:

$$-2(V1)+\frac{IT}{C}$$

where I is the constant current, T is time during which terminal 24 is at voltage −V1, and C is the capacity of the capacitance 28.

When the voltage at the junction 40 becomes slightly positive, the transistor 42 turns on. The collector voltage of the transistor 42 drops to ground potential, and the transistor 16 is turned on. When the transistor 16 turns on, the transistor 25 turns off. The voltage +V1 again appears at the output terminal 24 and the capacitance 28 charges through the resistance 29 and the base-emitter junction of the transistor 42. It should be noted that during the time the output voltage is at −V1, a large back-bias is applied to the diodes 14 and 15 by the respective resistances 22 and 23. Thus, during that time, subsequent signals would not affect the operation of the latch.

The input is now enabled by applying +V1 through the resistances 22 and 23, charging the capacitances 12 and 13 respectively so that the diodes 14 and 15 are only back-biased by a small voltage. The latch is now ready to respond to another input pulse.

As noted previously, voltages may be applied to the input terminals 36 and 39 to control the amount of current supplied by the transistor 30. The amount of current supplied by the transistor 30 in turn determines the charging time of the capacitor 28 and, thus, the duration of the output pulse at the output terminal 24. Since an output signal on the terminal 24 is applied back through the resistances 22 and 23 to inhibit the diodes 14 and 15, the time constants of the RC circuits (resistance 22 and capacitance 12, and resistance 23 and capacitance 13) may be changed as desired to control the maximum pulse repetition rate of the latch. Opposite type transistors may be utilized and the diodes and voltages reversed to provide a latch which responds to a negative-going input signal.

It now should be apparent that the present invention provides a latch in which the duration of the output pulse may be precisely controlled by controlling the magnitude of a constant current. The magnitude of the constant current and the value of a capacitor determine the duration of the output pulse.

Although particular components, voltages, etc., have been discussed in connection with a specific example of a circuit constructed in accordance with the present invention, others may be utilized. Furthermore, it will be understood that although an exemplary embodiment of the present invention has been disclosed and discussed, other applications and circuit arrangements are possible and that the embodiment disclosed may be subjected to various changes, modifications, and substitutions without necessarily departing from the spirit of the invention.

What is claimed is:

1. A latch for receiving an input signal and providing an output signal comprising
- a source of constant current,
- first means connected with said source of constant current for controlling the magnitude of current supplied thereby,
- second means rendered operative by said input signal to provide an output signal at an output terminal,
- storage means for storing voltage levels including a pair of terminals, one connected with said output terminal and the other connected with said source of constant current, and responsive to said output signal to store a voltage level, and
- third means thereafter responsive to said voltage level connected with said second means and said storage means to render said second means inoperative.

2. A latch comprising
- a first transistor having a plurality of electrodes,
- first impedance means connecting an input terminal with a first of said electrodes of said first transistor,
- second impedance means connecting a second of said electrodes of said first transistor with an output terminal,
- a controllable constant current source,
- third impedance means connecting said output terminal with said current source,
- a second transistor having a plurality of electrodes, one input electrode of which is connected between said current source and said third impedance means, and a second output electrode of which is connected with the first of said electrodes of said first transistor,
- fourth feedback impedance means connected with said output terminal and said first impedance means, and
- a third transistor connected with its input circuit across said output terminal an the second of said electrodes of said first transistor.

3. A latch as in claim 2 wherein
- said first impedance means includes a capacitance in series with a unilaterally conducted device,
- said second impedance means includes a unilaterally conductive device, and
- said third impedance means includes a capacitance.

4. A latch as in claim 2 wherein
- said third impedance means includes a resistance connected in parallel with a unilaterally conductive device, and
- a capacitance connected in series with the parallel combination of said resistance and unilaterally conductive device.

5. A latch for receiving an input signal and providing an output signal of predetermined width comprising
- a first transistor for receiving said input signal,
- a second transistor connected with said first transistor and responsive to the operation of said first transistor to switch to a state opposite to that of said first transistor, a capacitor, an impedance network, a third transistor, means connecting said second transistor, said capacitor, said impedance network and said third transistor in series and with a voltage source, an output terminal connected to the junction of said second transistor and said capacitor, and a fourth transistor connected with said first transistor and said impedance network whereby a predetermined excursion of said input signal causes said first and fourth transistors to turn off and said second transistor to turn on until the charge on said capacitor reaches a predetermined voltage.

6. A latch for providing output signals in response to predetermined input signals comprising a first transistor for receiving said input signals, a second transistor connected with said first transistor, a capacitor, an impedance network, a current source, said capacitor, impedance network and current source being connected in series with said second transistor, an output terminal connected to the junction of said second transistor and said capacitor, a third transistor connected with said first transistor to maintain said first transistor in a state of conduction or nonconduction, means for controlling said current source to affect the charge on said capacitor, and means connecting said impedance network with said third transistor, whereby predetermined input signals cause said first transistor to become nonconducting, said first transistor causes said second transistor to become conducting, said second transistor causes said third transistor to become nonconducting, said third transistor holds said first transistor in said nonconducting state until the charge on said capacitor reaches a predetermined level.

References Cited by the Examiner

UNITED STATES PATENTS

| | | | |
|---|---|---|---|
| 3,014,138 | 12/61 | Moore et al. | 328—58 |
| 3,053,996 | 9/62 | Stefanova | 328—34 |

DAVID J. GALVIN, *Primary Examiner.*,